Dec. 23, 1969   A. GUDMUNDSEN   3,485,327
INERTIA ACTUATED SAFETY BRAKE
Filed Oct. 20, 1967   2 Sheets-Sheet 1
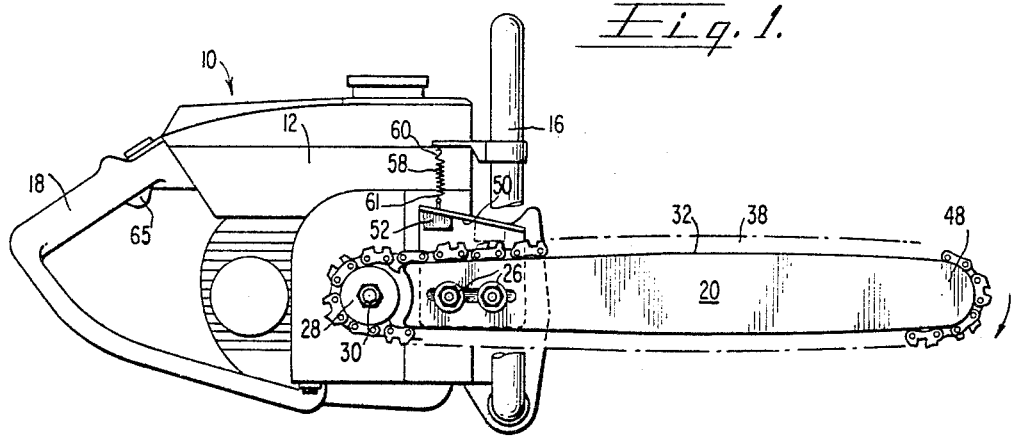
Fig. 1.
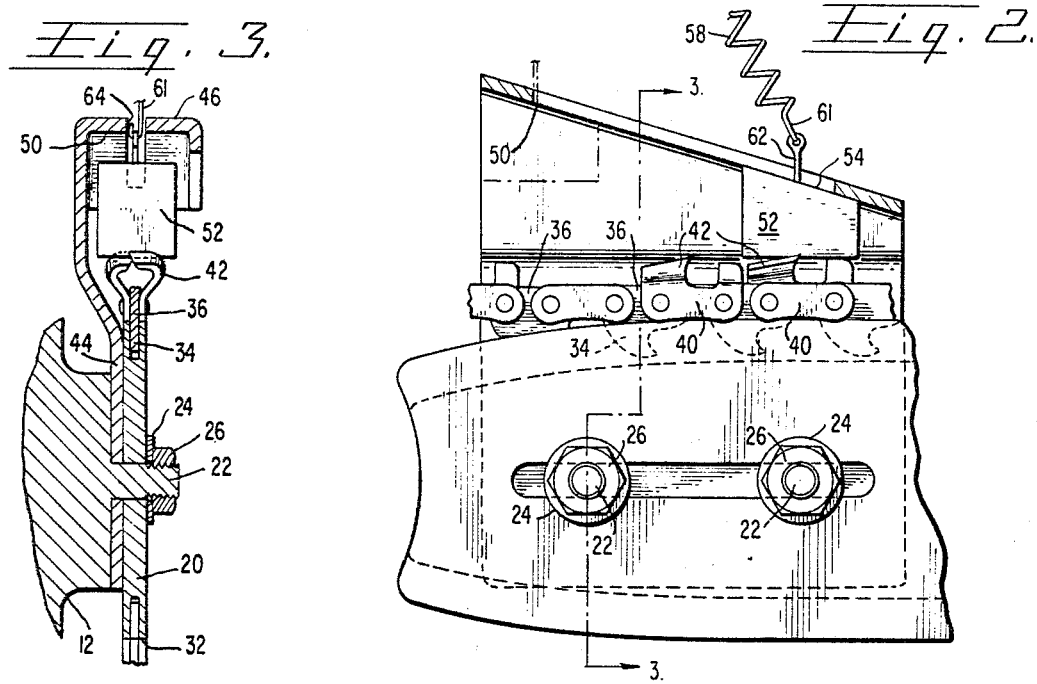
Fig. 3.
Fig. 2.
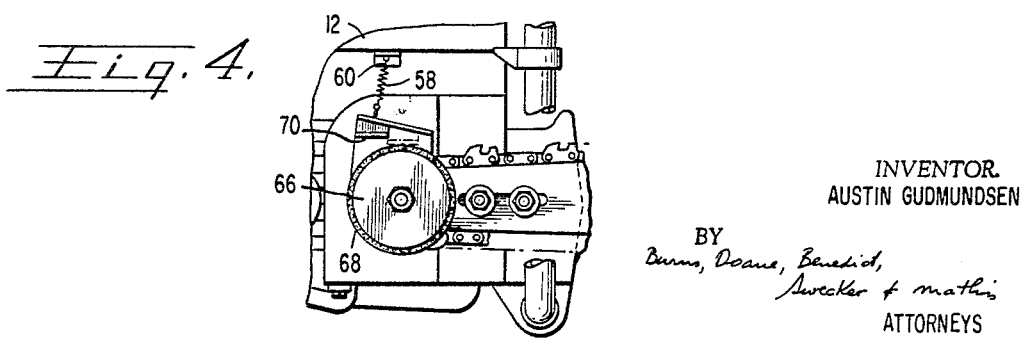
Fig. 4.
INVENTOR.
AUSTIN GUDMUNDSEN
BY
Burns, Doane, Benedict,
Swecker & Mathis
ATTORNEYS United States Patent Office 3,485,327
Patented Dec. 23, 1969

3,485,327
INERTIA ACTUATED SAFETY BRAKE
Austin Gudmundsen, Los Angeles, Calif., assignor to McCulloch Corporation, Los Angeles, Calif., a corporation of Wisconsin
Filed Oct. 20, 1967, Ser. No. 680,294
Int. Cl. F16d 51/60; B27b 17/00
U.S. Cl. 188—136                    19 Claims

ABSTRACT OF THE DISCLOSURE

An inertia-actuated safety brake for a chain saw in which the violent movement of the saw on the occurrence of "kickback" causes an inertia element to ride along a cam surface into engagement with the chain of the saw. Other embodiments include the inertia responsive jamming of a spring biased wedge between a cam surface and the friction surface of a braking drum, the tensioning of a brake band about a brake drum, and the engagement of a pawl with teeth on the periphery of a ratchet wheel.

BACKGROUND OF THE INVENTION

Portable chain saws have contributed materially to the revolution which has taken place in the lumber industry. The saws are fast in their cutting action, portable, and easily handled by a single relatively unskilled operator. The lightness and balance which make the saws of such importance to the industry unfortunately has proven a mixed blessing.

Under certain circumstances, in the operation of a chain saw, the cutting portion of the chain saw may be subjected to an unexpected and violent force directed upwards and/or towards the operator. This force is commonly referred to as "kickback" in the industry and results, for example, from the unexpected contact with a limb or the trunk of a tree when trimming branches. This "kickback" occurs with particular frequence when, as is often necessary or desirable, the operator is using the "nose" or extreme forward end of the saw for cutting where the cutting teeth are moving in a direction substantially normal to the longitudinal axis of the saw.

The violent movement of the saw which accompanies "kickback" is extremely difficult to arrest and the result occasionally is injury to the operator or to others in the immediate area. The operator, in attempting to regain control of the saw, almost invariably increases his grip on the speed control trigger conventionally located in one of the handles, thereby augmenting the danger. In addition to the injury to the operating personnel, the chain itself may be severely damaged due to contact with a metallic or other hard substance such as a tool or the like while still in rapid motion.

The seriousness of any mishap to personnel or machinery is of course often magnified by the distance between the site of the accident and the nearest medical aid and/or machinery repair shop. Not only is distance a consideration but the terrain is often most difficult and the roads all but impassible in the areas where logging and related operations are customarily conducted.

It is accordingly an object of the present invention to alleviate the disadvantages enumerated above by providing a novel method and apparatus for stopping the chain of a chain saw in the event that the operator loses control of the saw.

Another object of the present invention is to provide a novel method and apparatus for stopping the chain of a chain saw which functions automatically upon the occurrence of "kickback" without damaging the saw.

Another object of the present invention is to provide a novel method and apparatus for stopping the chain of a chain saw in which the kinetic energy of the driven chain is overcome by the wedging of an element between the chain and a cam surface attached to the frame of the saw.

Still another object of the present invention is to provide a novel method and apparatus for stopping the chain of a chain saw which may be manufactured at low cost, is easily serviced in the field and is substantially immune to mechanical difficulties from rough handling and other physical abuse.

A still further object of the invention is to provide a novel method and apparatus for stopping the chain of a chain saw which requires no critical adjustments and no special tools to reset after activation.

Other objects and advantages of the present invention will become apparent from the claims and from the ensuing detailed description when read in conjunction with the appended drawings.

THE DRAWINGS

FIGURE 1 is a side view of a chain saw equipped with one embodiment of the safety device of the present invention.

FIGURE 2 is an enlarged fragmentary view of the safety device shown in FIGURE 1.

FIGURE 3 is a section taken through lines 3—3 of FIGURE 2.

FIGURE 4 is an enlarged fragmentary side view of a chain saw embodying a second embodiment of the present invention.

GENERAL CHAIN SAW STRUCTURE

Figure 5:
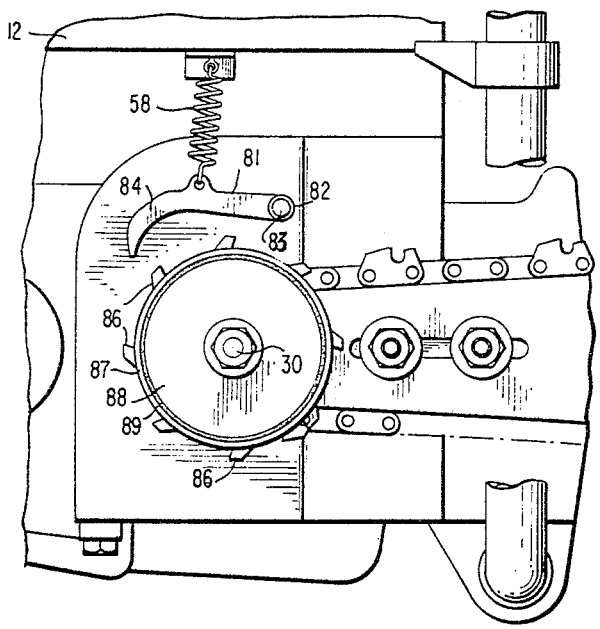
FIGURE 5 is an enlarged fragmentary side view of a chain saw embodying a third embodiment of the present invention.

Referring now to the drawings, FIGURE 1 is a side view of a conventional portable chain saw 10 including a housing 12 for a fuel tank and an engine (not shown). Housing 12 is provided with handles 16 and 18 for the use of the operator and a substantially flat blade or "guide bar" 20 is mounted in a forwardly extending position by means of a pair of threaded studs 22, washers 24, and nuts 26.

A sprocket wheel 28 is mounted on the shaft 30 of the engine which extends through the housing 12 anteriorly of the blade 20. The peripheral edge 32 of blade 20 is grooved to receive a portion 34 of the alternating links 36 of a chain 38. Other links 40 of the chain 38 are equipped with the cutting teeth 42 which perform the cutting operation as chain 38 is driven about the peripheral edge 32 of the blade 20 by the rotation of the shaft 30 and the sprocket wheel 28.

PREFERRED EMBODIMENT OF SAFETY STOP

The details of one embodiment of the safety stop of the subject invention may more clearly be seen in the enlarged fragmentary portion of FIGURE 1 shown in FIGURE 2.

A guide plate 44 is secured to the housing 12 of the chain saw 10 between the housing 12 and blade 20. This securing is accomplished by means of the blade 20, retaining studs 22, washers 24 and nuts 26, as shown in FIGURE 3. Plate 44 is formed in cross-section into an outwardly facing "question mark," the upper portion 46 overlying blade 20 at a distance which progressively decreases towards the nose 48 of the blade 20. The lower surface 50 of the overlying portion 46 of plate 44 thus forms a cam surface 50 upon which the chain arresting element 52 rides.

The chain arresting element 52 may conveniently be a block of hardwood, aluminum or of plastic or the like, the ductility thereof being somewhat greater than that of the cutting teeth 42 so as to avoid any injury to the teeth 42 upon contact. Element 52 is shaped so that its upper surface 54 conforms generally to the slope of the cam surface 50 when the lower surface 56 of the element is substantially parallel to the axis of the chain 38 at the anticipated point of contact.

The element 52 is maintained in contact with the cam surface 50 and out of contact with the cutting teeth 42 of the chain 38 by means of the tension of a coil spring 58 secured at one end 60 to the housing 12 of the saw 10 and attached at its other end 61 to a hook 62 threaded into the upper surface 54 of the element 52. The cam surface 50 of the upper portion 46 of plate 44 is apertured along a portion of its length to define a slot 64 through which hook 62 upwardly protrudes for attachment to the lower end 61 of spring 58.

In operating the saw, the operator customarily grasps the forward handle 16 with one hand and the rearward handle 18 with the other, the speed of the chain 38 being controlled by means of the pressure of the operator's forefinger on a trigger type switch 65 located on handle 18.

As may be seen from FIGURE 1, the movement of the chain 38 is substantially vertically downward about the nose 48 of the blade 20 of the saw 10. Any contact of the cutting teeth 42 with a relatively unyielding substance tends to arrest the movement of the chain 38. The reaction torque tends to rotate the entire saw 10 counterclockwise about the shaft 30 of the engine (not shown). This reaction is often extremely violent, as might be expected from the speed and power of the engine and the light weight and balance of the saw 10. This reaction is commonly referred to in the industry as "kickback" and is particularly dangerous when the motion of the chain 38 is arrested near the nose 48 of the blade 20 due to the increased moment arm through which the reaction torque acts.

Assuming the momentary arresting of the chain 38 at the nose 48 of the blade 20, the nose 48 of the blade 20 of the saw will move violently upward with the reaction torque. The movable element 52 which is secured to the housing 12 of the saw only by means of the light coil spring 58, because of its inertia, will not react with the speed of the saw 10. Relative motion between the element 52 and the saw 10 due to this time lag causes the element 52 to slide down the cam surface 50 into contact with the cutting teeth 42 of the chain 38. As the chain 38 moves forward, one of the cutting teeth 42 will be driven into element 52 pulling it forward at the speed of the chain 38. The decreasing distance between the cam surface 50 and the cutting teeth 42 causes one of the teeth 42 to be driven into the element 52 to an increasing depth thus preventing any slippage and at the same time results in the application of an increasing frictional force between the upper surface 54 of the element 52 and the cam surface 50. The element 52 is thus jammed between the cam surface 50 of the upper portion 46 of the plate 44 and one of the cutting teeth 42, arresting movement of the chain 38 and stalling the engine of the saw 10.

As readily anticipated, the jamming of the element 52 between the cam surface 50 and the cutting teeth 42 of the chain 38 occurs almost instantaneously upon "kickback" due to the speed of the chain 38 and despite the tendency of the operator to increase the force applied to the trigger switch 65 in attempting to regain control of the violently reacting saw 10. Injury to the operator or co-workers and to the cutting teeth 38 of the saw itself from the rapidly moving chain 38 is thus prevented by the immediate arresting of the movement of the chain 38, and the consequent stalling of the engine.

To reset the element 52 after it has been wedged into a position between the chain 38 and the cam surface 50 arresting of the movement of the chain 38 and after the engine has been stalled, it is only necessary to pry the element 52 backwards with a screwdriver (not shown) or some other simple prying tool or the like whereupon the element 52 will resume its initial position under the bias of spring 58.

A spare element may easily be installed simply by disconnecting the hook 62 from the lower end 61 of the spring 58 should the element 52 be damaged sufficiently to warrant replacement. The element 52 will drop away from the cam surface 50 under the influence of gravity and the hook 62 of a new element easily inserted through the slot 64 in the upper portion 46 of plate 44 for attachment to the lower end 61 of the spring 58.

ALTERNATIVE EMBODIMENTS

A second embodiment of the invention is shown in FIGURE 4 wherein a brake drum 66 is mounted on the shaft 30 of the engine for rotation therewith. The surface 68 of the brake drum 66 and/or the lower surface 70 of the element 52 may be any conventional friction material. The remaining components are identical to those of the embodiment illustrated in FIGURE 2 except for the physical location of the plate 44, and have thus been accorded corresponding numerical designations. As may be readily seen from FIGURE 4, the slotted plate 44 has been displaced rearwardly from the blade 20 retaining studs 22 to a position overlying the uppermost portion of the friction surface 68 of drum 66.

The use of the spring 58 to bias the element 52 into contact with the lower surface 50 of the upper portion 46 of the plate 44 and out of contact with the friction surface 68 of the drum 66 has been described in some detail supra. The spacing of the cam surface 50 from the friction surface 68 of the drum 66 is such that the element 52 is firmly wedged therebetween immediately upon contact of the element 52 with the surface 68 of the drum 66. Contact between the element 52 and the surface 68 occurs upon "kickback" and the violent reaction of the saw 10 about the shaft 30 of the engine as the tension in the spring 58 is overcome and the element 52 rides down the cam surface 50. This wedging action results in ever increasing friction between the friction surface 68 of the drum 66 and the lower surface 70 of the element 52 and also between the upper surface 54 of the element 52 and the cam surface 50. Rotation of the shaft is thus asserted almost instantaneously, stalling the engine, and stopping all movement of the chain 38 of the saw 10.

Still another embodiment is illustrated in FIGURE 5 wherein a pawl 81 is pivotally secured at one end 82 by pin 83 to the housing 12 of the saw 10 and a spring 58 is attached to the other and free end 84 to maintain the free end 84 of the pawl 81 out of contact with projections or cogs 86 on the periphery of a cog bearing sleeve 87. Sleeve 87 is pre-loaded about the peripheral friction surface 89 of drum 88 which is secured to the shaft 30 of the engine for rotation therewith. Upon the reaction of the saw 10 about the shaft 30 upon the occurrence of "kickback," the tension in the spring 58 will be overcome and the free end 84 of the pawl 81 will engage one of the cogs 86 on the periphery of the cog bearing sleeve 87 immediately arresting its rotation. The friction between the friction surface 89 of the drum 88 and the pawl detained cog bearing sleeve 87 will arrest the rotation of the drum 88 on shaft 30 to stall the engine.

SCOPE OF THE INVENTION

The invention may obviously be embodied in specific forms other than those illustrated without departing from the spirit or essential characteristics thereof. The present embodiments are therefore to be considered in all respects as illustrative and not restrictive.

What is claimed is:

1. Apparatus for stopping the chain of a portable chain saw having a housing, an endless chain having a plurality of cutting teeth, and driving means for driving the chain, said apparatus comprising:
- an inertia responsive element movably mounted on said chain saw,
- driven means, including the endless chain, driven by the driving means,
- means for yieldably holding said element out of engagement with said driven means,
- said means for yieldably holding said element out of engagement with said driven means being, itself, out of engagement with said driven means,
- means for guiding said element into locking cooperation with said driven means responsive to movement of said housing caused by an imposition of sudden force to said saw.

2. The apparatus of claim 1 wherein said inertia responsive element comprises a material having greater ductility than the teeth of the chain, and
- wherein said inertia responsive element is operable to engage the chain in response to movement of said housing caused by an imposition of sudden force to said saw.

3. The apparatus of claim 1
- wherein said means for guiding said element includes a cam surface secured to the housing, and
- wherein said means for yieldably holding said inertia responsive element includes spring means for biasing said element in contact with said cam surface and away from said driven means.

4. The apparatus of claim 3 wherein said element comprises a material having greater ductility than the chain,
- wherein the plane of said cam surface is substantially normal to the median travel plane of said chain, and
- wherein said inertia responsive element is operable to engage said chain in response to movement of said housing caused by an imposition of sudden force to said saw.

5. The apparatus of claim 4
- wherein said cam surface is slotted along a portion of its length, and
- wherein said apparatus includes means extending through said slot for connecting said element to said spring means.

6. The apparatus of claim 1
- wherein said driven means comprises a rotatable drum having a cylindrical locking surface,
- wherein said means for guiding said element includes a cam surface secured to said housing, and
- wherein said means for yieldably holding said inertia responsive element includes spring means for biasing said element in contact with said cam surface and away from said cylindrical locking surface.

7. The apparatus of claim 6 wherein said drum is mounted coaxially with one end of said chain.

8. The apparatus of claim 7
- wherein said cam surface is apertured along a portion of its length, and
- wherein said apparatus includes means extending through said aperture for connecting said element to said spring means.

9. The apparatus of claim 8 wherein the plane of said cam surface is substantially normal to the median travel plane of said chain.

10. The apparatus of claim 6
- wherein said inertia responsive element comprises a pawl,
- wherein said guiding means includes means pivotally connecting said pawl to said housing, and
- wherein said cylindrical locking surface includes pawl engaging means on the periphery of said drum.

11. The apparatus of claim 10 wherein said means for yieldably holding said inertia responsive element includes spring means connected between said pawl and said housing.

12. The method of stopping the endless, cutting chain of a chain saw having a housing, driven means including, an endless chain having a plurality of cutting teeth, and driving means for driving the driven means, said method comprising:
- imparting a sudden force to said saw, resulting in movement of said housing; and,
- in response to the movement of said housing acting upon an inertia responsive element, guiding said inertia responsive element into locking cooperation with said driven means.

13. The method of claim 12 wherein said inertia responsive element is guided into wedged, drive means locking position.

14. The method of claim 12 wherein said inertia responsive element is guided into wedging cooperation between said chain and a cam surface carried by the housing of said chain saw.

15. The method of claim 12 wherein said inertia responsive element is guided into wedging cooperation between said cam surface carried by the housing of said saw and a cylindrical surface driven by said driving means.

16. The method of claim 12 wherein said inertia responsive element is guided into wedging cooperation between a drum having a friction surface and a cam surface carried by the housing of said chain saw.

17. The method of claim 12 wherein said inertia responsive element is guided into locking engagement with a projection on a drum driven by said driving means.

18. The method of claim 12 wherein said inertia responsive element is guided into engagement with a projection on a cog bearing sleeve in pre-stressed frictional engagement with said driving means.

19. The apparatus of claim 6
- wherein said inertia responsive element comprises a pawl; and
- wherein said cylindrical locking surface includes pawl engaging means on the periphery of a cog bearing sleeve in frictional engagement with the periphery of said drum.

References Cited

UNITED STATES PATENTS

| | | | |
|---|---|---|---|
| 1,138,902 | 5/1915 | Smith | 188—136 X |
| 1,617,565 | 2/1927 | Bens | 143—32 |
| 2,434,174 | 1/1948 | Morgan. | |
| 3,237,729 | 3/1966 | Proctor | 188—188 X |
| 3,240,510 | 3/1966 | Spouge. | |

DUANE A. REGER, Primary Examiner

U.S. Cl. X.R.

143—32; 188—65.1